3,038,870
PROCESS OF PREPARING AND EXTRUDING AN AQUEOUS GEL OF POLYTETRAFLUOROETHYLENE
Hans Schott, Wilmington, Del., assignor to E. I. du Pont de Nemours and Company, Wilmington, Del., a corporation of Delaware
No Drawing. Filed Dec. 27, 1956, Ser. No. 630,774
1 Claim. (Cl. 260—29.6)

This invention relates to a new and improved process for the preparation of shaped articles from water insoluble polymers. More particularly, it pertains to the production of fibers, films and molded objects from discrete particles of these polymers.

Fibers and films composed of polymeric materials may be spun or cast by dry (evaporative), wet (coagulating bath), or melt processes. The use of organic solvents in wet or dry spinning or casting has the disadvantage of solvent cost, the expense of solvent removal and recovery and, frequently chemical instabiltiy and toxicity of the solvent. Wet spinning and casting involves the additional expense of purification and drying, and melt-shaping frequently causes degradation of polymer and involves the use of costly special equipment.

The fabrication of shaped articles from concentrated aqueous salt solutions suggested in the case of certain polymers, has some of the same disadvantages as the use of organic solvents with the further disadvantage that the products tend to be porous, weak and non-homogeneous. An additional difficulty is that high polymer concentrations cannot be obtained in salt solution except at temperatures so high as to degrade the polymer. Furthermore, hot salt solutions are often highly corrosive, thus requiring the use of expensive corrosion-resistant equipment.

The elimination of the dissolving or melting step now required prior to the shaping of certain polymers is highly desirable. A method for preparing shaped articles which would eliminate the usual steps of isolation and purification required for some polymers prior to dissolving or melting, is also very desirable. For example, some polymers, particularly the vinyl-type polymers, can be made by emulsion polymerization in an aqueous medium in which the polymer is insoluble. Hitherto, the polymer was isolated from the resulting dispersion by coagulation, washing, drying and grinding, and was shaped into articles by means of a melt or from solution. A method for preparing the shaped articles directly from the aqueous dispersion is a worthy objective because it would eliminate many of these unit operations.

Certain intractable polymers such as polytetrafluoroethylene have the highly desirable properties, particularly in the form of fibers, of chemical inertness, high heat stability, non-adhesiveness, low modulus, low wetability with water and organic solvents, low coefficient of friction and unique electrical properties, and, because of these properties, offer promising utility for many purposes. However, the chemical inertness and high temperature stability has made the processing of polytetrafluoroethylene into fibers and the like difficult, and they cannot be formed or spun by conventional wet, dry or melt shaping or spinning methods.

An object of this invention is to provide a novel process for the preparation of shaped articles, and particularly fibers and films, from discrete particles of polymers dispersed in aqueous media. Another object is to facilitate the handling of freshly extruded shaped articles obtained from high molecular weight and intractable polymers. Other objects will appear hereinafter.

The objects of this invention may be accomplished by thoroughly dispersing a water-insoluble fiber-forming polymer in an aqueous medium containing a minor proportion of a gelable matrix-forming material dissolved therein, adding a water-soluble material (as a powder or as an aqueous solution) which will gel the matrix, stirring this mixture until a smooth gel is formed, shaping this gel into the desired form, e.g., by extrusion through a slot or orifice, by molding, etc., and conveying the shaped article into a region where coalescence of the dispersed, water-insoluble polymer particles occurs without destroying the shape of the article whereby to obtain a continuous phase of the insoluble polymer. The use of a gelled matrix material for embedding and immobilizing the discrete fiber-forming polymer particles before shaping, defines a process which is distinctly different from previous processes.

In contrast to a recently discovered method of spinning discrete particles, wherein the matrix is gelled by extrusion into a coagulating or setting bath, the discrete particles are, in the practice of the present invention, immobilized before extrusion, no further coagulation of the matrix being required. The matrix gel containing the discrete particles of the water-insoluble polymer remains stable for long periods and will, unless subjected to substantial stress, retain its gelled shape. However, it may, after having been formed into one shape, be reshaped, repeatedly if desired, by the application of suitable pressure prior to coalescing of the particulate water-insoluble polymer in the formation of the final article.

Gelable matrix materials which may be used in the process of the present invention are polyvinyl alcohol and other hydroxyl-bearing water-soluble polymers. The water-soluble borates are effective as gelling agents for the matrix and are believed to effect gelling by cross-linking molecules of the matrix material through reaction with hydroxy groups of the polymer. The exact nature of the reaction is, however, not fully known. Dilute aqueous solutions of polyvinyl alcohol are slightly pseudoplastic liquids and have rather low viscosities at room temperature; for example, the viscosity at 30° C. of an aqueous solution of 2%–5% aqueous polyvinyl alcohol ranges from 6–16 cp. (centipoises). On addition of a small amount of borax or other soluble borate to a 3.3% aqueous polyvinyl alcohol solution, however, the solution is converted quickly into a translucent, rather soft and rubbery gel. This gel retains all the liquid that is present in the solution before the borate is added, and occupies the same volume. The addition of further substantial quantities of water tends, however, to weaken and reverse the gel, but the amount of water which the gel will tolerate within the limits of gel stability, can readily be determined by experiment.

If a finely dispersed fiber-forming polymer is suspended in polyvinyl alcohol solutions, it, too, is bound in the gel formed on adding borates. An interesting fact discovered in connection with the present invention is that these gels containing finely dispersed fiber-forming polymer in high concentration, are quite form stable. They can be submitted to shearing force, filtered through sand packs used in the spinning of fibers, extruded through filament-forming capillaries, and pressed into films or molded into articles at room temperature without undergoing syneresis, i.e., without shrinking with simultaneous separation of fluid, and without separation or segregation of the dispersed polymer.

In the examples, which are given for illustrative purposes only and are not limitative, the parts, percentages and proportions are given in percentages by weight unless otherwise indicated. All processes of the examples were carried out at room temperature (about 25° C.) unless otherwise stated, and the filament tenacities and elonga-

Example I 16 parts of a 15% solution in water of polyvinyl alcohol (free of acetate groups and sold as "Elvanol" 62–71 by E. I. du Pont de Nemours and Company) is thoroughly blended by thorough stirring, with 100 parts of a commercial 60% aqueous polytetrafluoroethylene dispersion sold by E. I. du Pont de Nemours and Company. The fluid mix is concentrated by decanting off the upper liquid portion which is low in polytetrafluoroethylene since the latter tends to concentrate at a lower liquid level, and 30 parts of a 16% aqueous solution of borax (sodium tetraborate decahydrate) is added under stirring sufficiently vigorous to effect thorough commingling while preventing the introduction of air bubbles into the mixture. The gel, which is quite form-stable, containing 63% polytetrafluoroethylene, 2.5% polyvinyl alcohol, 0.5% sodium tetraborate (calculated in all solutions of the examples as anhydrous), and 34% water, is press-spun into filaments under -3,000 p.s.i. (p.s.i. wherever used in this specification signifies pounds per square inch gage pressure) through a sand pack filter adjacent to the spinneret and is extruded through a spinneret orifice of 0.015 inch diameter. The gel filament, containing the discrete particles of polytetrafluoroethylene, is self-supporting in lengths of several feet. It is heated by contact with a sintering wheel maintained at 400° C. which causes the polyvinyl alcohol matrix to carbonize and largely to gasify and causes the polytetrafluoroethylene particles to sinter. The resulting fiber is drawn subsequently to 500 up to 1,000 percent of its original length at 350° C., to yield a filament having a tenacity of 0.95 gram per denier and higher, and an elongation of 19% and lower.

Example II

A gel is made by blending a 10% aqueous polyvinyl alcohol solution (similar except for polymer percentage to that of Example I) with twice its weight of a 60% aqueous polytetrafluoroethylene dispersion like that used in Example I. Subsequently, a small amount of solid sodium tetraborate decahydrate is added with strong agitation to produce a gel with the following composition:

| | Percent |
|---|---|
| Polytetrafluoroethylene | 30 |
| Polyvinyl alcohol | 3.2 |
| $Na_2B_4O_7$ | 0.4 |
| Water | 66.4 |

This gel is cold pressed into a thin layer, dried at 100° C., and heated under pressure at 400° C. (to coalesce the polytetrafluoroethylene) yielding flexible, strong, thin, brown, semitranslucent films. (Drying may be resorted to prior to sintering, as in this and other examples to remove the bulk of the water although, alternatively, the water may be removed during sintering).

Example III

A gel is made by blending an aqueous polyvinyl alcohol solution similar to that of Example I with an aqueous dispersion of fiber-forming polyacrylonitrile (intrinsic viscosity of about 1 to 2) and stirring the mixture with a solution of sodium tetraborate decahydrate. This gel, containing 27% acrylonitrile polymer, 2.9% polyvinyl alcohol, and 0.6% $Na_2B_4O_7$, is press-spun at room temperature under 1,000 p.s.i. into filaments. These rather strong, self-supporting gel filaments are immersed for a few seconds into hot dimethylformamide, which causes coalescence of the dispersed particles of polyacrylonitrile. The fiber is washed with water to remove the polyvonyl alcohol and borate and is drawn 10× (10 times its original length) on a round pin heated to 175° C.

Example IV

A commercial aqueous dispersion of fiber-forming partially N-methoxy methylated poly(hexamethylene adipamide) sold as DV–55 by E. I. du Pont de Nemours and Company, prepared as described in Cairns, United States Patent No. 2,467,186, and having 55% of the theoretical maximum methoxy substitution, is concentrated to contain 28% solids, is blended with a 10% solution of polyvinyl alcohol solution in water (same solution as in Example II), and is gelled with 10% sodium tetraborate solution to give, after stirring, a gel containing 21% polyamide, 2.9% polyvinyl alcohol, and 0.7% sodium tetraborate. This gel is press-spun and the resulting filament, which is self-supporting in lengths of several feet, was immersed for a few seconds into hot (70° C.) ethyl alcohol or hot (70° C.) tetramethylurea, followed by air drying. The fibers thus obtained from the rubbery polyamide have a tenacity of 0.12 gram per denier and an elongation of 200%.

Example V

In order to determine the smallest amount of polyvinyl alcohol necessary to incorporate all of the polytetrafluoroethylene dispersion into the gel obtained by addition of borax, decreasing amounts of polyvinyl alcohol solution (of Example II) and decreasing amounts of borax solution are blended with portions of a 60% aqueous polytetrafluoroethylene dispersion (of Example I), and the gels examined. The results were as follows:

100 grams polytetrafluoroethylene dispersion plus 100 cc. 10% polyvinyl alcohol solution plus 10 cc. of an aqueous solution containing 16% sodium tetraborate are mixed. The resulting gel is stiff, bouncy, tough, rubbery, and plastic. It is easy to tear, and can be molded by manual pressure.

100 grams polytetrafluoroethylene dispersion is blended with 75 cc. of a 10% aqueous polyvinyl alcohol solution and 7.5 cc. of the above borax solution. The gel has the same properties as the above.

100 grams polytetrafluoroethylene dispersion and 50 cc. 10% aqueous polyvinyl alcohol solution are blended and 5 cc. of the above borax solution are added. The gel has similar properties to the above, and is cold pressed to a film on a Carver press at low pressure, dried at 100° C. and pressed at about 7,500 p.s.i. at 400° C. for sintering. The resulting film is semi-translucent, dark brown, flexible, and strong, and has some drawability. It feels greasy to the touch.

100 grams polytetrafluoroethylene dispersion and 25 cc. polyvinyl alcohol solution are blended and 2.5 cc. of the above borax solution added. On long standing, some white fluid polytetrafluoroethylene dispersion separates.

100 grams polytetrafluoroethylene dispersion and 15 cc. polyvinyl alcohol solution are blended and 1.5 cc. of the above borax solution added. This mixture separates in a fairly short time into a white fluid dispersion at the bottom and a rubbery gel plug floating on top. The latter has a consistency similar to the gels of the first four runs, and holds part of the polytetrafluorcethylene dispersion.

100 grams polytetrafluoroethylene dispersion are blended with 10 cc. polyvinyl alcohol solution and 1 cc. of the above borax solution. The mixture separates in a short time like the above next preceding run.

100 grams polytetrafluoroethylene dispersion are mixed with 5 cc. polyvinyl alcohol solution and 0.5 cc. of the above borax solution are added. The gel separates in a short time from the excess dispersion as above.

The gel separated in the last four tests has about the same consistency as those obtained in the first three tests but is smaller in volume. As the polyvinyl alcohol content decreases progressively below that of the third test, the amount of gel decreases and the amount of free fluid of the polytetrafluoroethylene dispersion not held by the gel increases.

The gel with the overall composition: polytetrafluoroethylene/polyvinyl alcohol/Na$_2$B$_4$O$_7$/water 39/3.2/0.5/ 57.3, contains enough polyvinyl alcohol to prevent syneresis and to hold the whole system in the gel. The experiments with less polyvinyl alcohol lack a sufficient amount of polyvinyl alcohol to keep the whole polytetrafluoroethylene dispersion in the gel. Hence, about 3% of polyvinyl alcohol is the minimum to produce shear and shelf-stable gels holding all of the water. The gels separated in the course of the last few of the preceding tests can also be used since they actually contain borax in sufficient quantity, i.e., about 3% to stabilize the gel.

*Example VI*

A gel of the following composition is prepared as in Example I:

|  | Percent |
|---|---|
| Polytetrafluoroethylene | 63 |
| Polyvinyl alcohol | 3 |
| Sodium tetraborate | 0.5 |
| Water | 33.5 |

This gel is extruded at room temperature through a spinneret orifice of 10 mil diameter and having a capillary length of 0.15 inch. To eliminate the occasional wiggling of the extruded filament, a short pack of coarse sand is added before the spinneret plate. The gel filament is self-supporting in lengths of several feet. It can be wound up and back-wound. By storing the bobbin in a moist atmosphere, the filament maintains its strength and flexibility.

The gel filaments are dried at room temperature, at 80° C., or at 150° C. and sintered at 400° C. on a hot plate. These filaments, brown-gray in color, are drawn 3× at 25° C. The drawn polytetrafluoroethylene fibers have the following characteristics:

| Tenacity | g.p.d. | 0.4–0.5 |
|---|---|---|
| Elongation | percent | 25–35 |
| Initial modulus | g.p.d. | 2.1–3.6 | regardless of whether they are dried at 80°, 150° or at room temperature.

*Example VII*

To produce a thick layer of a polytetrafluoroethylene coating on a surface, a series of thin layers of commercial polytetrafluoroethylene dispersion has to be applied successively, because a thick layer of the dispersion mud-cracks upon drying. The problem of applying a heavy polytetrafluoroethylene coat to a metal surface in one operation instead of building it up from successive thin layers, is twofold. It requires (*a*) finding a polytetrafluoroethylene dope which does not mud-crack on drying nor on sintering, even if applied as a thick layer, and (*b*) finding a means of immobilizing the freshly applied coat before it is dry, in order to prevent its running on a non-horizontal surface.

The first problem is solved readily by using a 42% polytetrafluoroethylene/3% polyvinyl alcohol/55% water dispersion blend. A layer 25 mils thick is cast onto a stainless steel plate and permitted to air dry. This gives a uniform coat with very good adherence to the metal. After heating for 3 minutes at 400° C., the dried mix turns to a dark uniform coating 8 mils thick, with excellent adherence to the steel.

This mix spread onto a vertical surface as a 25 mil thick layer, of course, runs down the surface. By gelling the polyvinyl alcohol with borax, before spreading on the surface, the polytetrafluoroethylene particles are immobilized and running thus prevented.

*Example VIII*

From a gel composition containing 42% polytetrafluoroethylene, 3% polyvinyl alcohol, and 0.4% sodium tetraborate in 54.6% water, prepared as in Example I using the same polyvinyl alcohol and polytetrafluoroethylene, filaments are spun through a spinneret orifice having an orifice diameter of 30 mils and an orifice capillary length of 0.2 inch at room temperature. The extruded filament is dried at room temperature, sintered over hot rolls at 400° C., and drawn by heating it above the crystalline melting point of the polytetrafluoroethylene, i.e., above 327° C. A draw ratio of 8× is obtained at 350° C. and produces a fiber of 0.9–1.0 g.p.d. tenacity, 15–20% elongation, and 6–8 g.p.d. initial modulus.

*Example IX*

290 g. of a 25% solution of dextran (of the grade sold by Syrups and Sugars, Inc.) are blended with 371 g. of a 60% polytetrafluoroethylene dispersion such as that used in Example I. This fluid blend is gelled by the addition of 10 g. potassium borate decahydrate (K$_2$B$_4$O$_7$.10H$_2$O) under vigorous stirring. The resulting rubbery and rather soft gel consists of 11% dextran, 33% polytetrafluoroethylene solids and 1.5% potassium borate. Thin layers of this gel, pressed at room temperature, are self-supporting in short lengths. They are dried at 100° followed by sintering at 400°. The resulting films are strong and coherent; their tenacities are of the order of 500 p.s.i. and their elongations about 5%.

*Example X*

261 g. of a 20% solution of starch acetate (grade RT sold by Stein, Hall and Company) are blended with 371 g. of a polytetrafluoroethylene dispersion of 60% solids such as that of Example I. This blend is gelled by the addition, with vigorous stirring, of 8 g. sodium borate (Na$_3$BO$_3$) containing water of crystallization, i.e., the commercial form of salt. The rubbery gel, composed of 1.3% sodium borate, 8% starch acetate, 35% polytetrafluoroethylene and 55.7% water, is pressed at room temperature to films. Small lengths of these gel films are self-supporting. The films are dried at 100° and sintered at 400° to produce a strong leathery layer of polytetrafluoroethylene.

*Example XI*

A gel is made by blending a 12% polyvinyl alcohol/polyvinyl acetate (87/13) solution (sold by E. I. du Pont de Nemours and Company as "Elvanol" 50–42 incompletely hydrolyzed vinyl acetate polymer still containing 13% of the theoretical maximum content of acetate groups) with a 60% polytetrafluoroethylene dispersion (such as used in Example I) and then adding commercial potassium borate (K$_3$BO$_3$) containing water of crystallization; the gel composition is 30% polytetrafluoroethylene, 3.9% polyvinyl alcohol/acetate, 0.5% borate and 65.6% water. This tough, rubbery gel is compressed at room temperature to a ⅛ inch thick layer, dried at 100°, and sintered at 400° to yield a strong film of a tenacity of the order of 1,000 p.s.i.

It is particularly noteworthy that no fibrillation (minute fiber-like formation or separation) of the polytetrafluoroethylene was ever observed on forcing the hereinbefore described gels through a sand pack and/or spinneret, but, on the contrary, the state of the gel remained homogeneous. The extruded gel filament could be kneaded into a mass that has the same consistency as the original gel and could be extruded repeatedly at about the same pressure. When the extruded gel fibers were kept under water for a few days, they fell apart in some instances, and microscopic observation showed that the polytetrafluoroethylene particles were just as finely dispersed as in the original dispersion prior to incorporation into the gel.

Under similar conditions of viscosity and shear, most other polytetrafluoroethylene systems undergo extensive fibrillation, in which case vastly increased spinning pressures are required. The absence of fibrillation of polytetrafluoroethylene in the above gel composition when submitted to high shear is due to the stiff and elastic matrix in which the polymer is finely dispersed and immobilized. Even under flow at high shear rates, the polytetrafluoroethylene particles presumably do not come in contact with each other due to the nature of the continuous polyvinyl alcohol/borax gel in which they are embedded. This observation, together with the absence of syneresis on standing and under shear, attests to the unusual stability of these polyvinyl alcohol gels and to their suitability as a vehicle for preparing objects from dispersed polymer.

From the above examples it can be seen that novel gel fibers comprising the water insoluble, synthetic polymer and the matrix material are produced. It is surprising that these can be lead over drying and sintering rolls or through long baths in an unsupported fashion when it is realized that the synthetic polymer particles, constituting the major portion of the gel, are in an uncoalesced form. The gel fibers of this invention have self-supporting lengths of several feet. These gel fibers can be wound up and stored or treated in package form in subsequent steps such as washing or coalescing. The gels may have the following composition: 15%–85% discrete particles of fiber-forming polymers, 2.0%–10% and preferably 2.7%–5% polyvinyl alcohol or other gelable polymers listed herein, 0.05%–5% and preferably 0.3%–0.5% water-soluble borate, remainder being water.

Since the gels of this invention are quite stiff, a substantial pressure will be used in extruding or otherwise shaping articles therefrom. Such pressure need only be enough to shape the articles and may be varied within wide limits; for extrusion into fine filaments through a spinneret, the pressure may be 500#/sq. inch or higher.

For convenience much of the foregoing discussion has been concerned with the preparation of fibers and filaments. It should be clearly understood, however, that this new invention applies equally well to the formation of films, foils, tapes, ribbons, bristles, yarns, coatings, and the like, as well as to other shaped and molded articles.

Furthermore, the discussion has been mainly directed to polyvinyl alcohol as the gelable matrix material. From the examples, however, it will be clear that other hydroxyl group-containing polymers such as partially hydrolyzed polyvinyl acetate, specifically a copolymer of vinyl alcohol and vinyl acetate produced by hydrolyzing polyvinyl acetate, dextran, and starch acetate also act as equivalent gelable matrix materials. Other copolymers of vinyl alcohol, which have vinyl alcohol as the major constituent, are gelable in water and may be used as the matrix material.

Water-soluble borates are used as the gelling agents in the practice of the invention. Generally speaking, those borates having a pH higher than 7 are operative. Specific borates suitable for use as gelling agents in the practice of the invention are the water-soluble salts, particularly the sodium, potassium and lithium salts of the various acids of boron, e.g., sodium tetraborate, $Na_2B_4O_7$ (borax, which is usually in the form of the decahydrate), sodium borate, $Na_3BO_3$, sodium metaborate, $NaBO_2$, sodium perborate, $NaBO_3$, also $Na_2HBO_3$ and $NaH_2BO_3$ (or other alkaline reacting salts of the acids of boron) and the other corresponding alkali metal borates, these salts being water soluble. Water-soluble borates are those sufficiently soluble to gel the matrix, this solubility being generally at least 3% solubility of the borate in water.

Although tetrafluoroethylene polymers which are so difficult to shape into filaments and other articles by previously known methods, are the preferred form of material treated in accordance with the present invention, the invention may also be applied with great benefit to water-insoluble, synthetic linear polymers, particularly those having a molecular weight of 10,000 or higher, and especially those known as film- and fiber-forming polymers; especially interesting are those which can be drawn (permanently elongated) with orientation to impart high filament and film strength.

The present invention is applicable to all the following polymers and many more, but is desirable mainly for polymers which cannot be spun from their melt and for which a successful and economical method of solution spinning has not been discovered. The only requirement for the polymer is that it can be coalesced by either heat application (including sintering), or by the use of a solvent or a near-solvent, which, in a short period of contact, dissolves or softens the outside of the polymer particles so as to effect cohesion of the particles into a unitary structure. A near-solvent is an organic or inorganic liquid which, at the temperature of contact with the shaped polymer, renders the polymer particles sufficiently tacky to form the continuous structure but without leaching the polymer out to a substantial extent. Coalescing by heat, hereinbefore referred to as sintering, can be carried out in a number of ways: by contact of the shaped article with liquid media such as molten Woods metal, fused salt baths, inert hydrocarbons which are liquid at the desired temperature, with gaseous media such as air, inert gases or vaporized non-solvent liquids, with radiant heat such as is provided by infrared lamps and furnaces, and with heated surfaces such as wheels, rods, bars, rolls, pins, and plates. Combination of these media may also be used. For example, the tetrafluoroethylene polymer particles in a matrix gel obtained by the shaping method of the present invention may be coalesced by lifting them through a stream of hot air onto a wheel heated to 380° C. The particles sinter on this wheel to produce a strong, drawable continuous filament.

Some of the many polymers that can be used as the particulate, dispersed phase of the gel include: acrylonitrile polymers and acrylonitrile copolymers (particularly those containing at least 85% acrylonitrile in the polymer molecule), polyacrylic and polymethacrylic esters, such as poly(methyl methacrylate); poly(vinyl chloride) and copolymers of vinyl chloride with vinyl esters such as vinyl acetate or with acrylonitrile or vinylidene chloride; copolymers of vinyl compounds with conjugated dienes such as butadiene; vinylidene chloride polymers; polyethylene; polytetrafluoroethylene; polychlorotrifluorcethylene; poly(vinyl acetate); poly(methyl vinyl ketone); polyvinyl ethers; chlorsulfonated polyethylene; poly(vinyl carbazole); poly(vinyl acetals); partially hydrolyzed poly(vinyl esters); polyamides such as poly(hexamethylene adipamide); poly(N-methoxymethyl hexamethylene adipamide); poly(ethylene sebacamide); poly(methylene bis-[paracyclohexylene] adipamide); polyureas such as poly(tetramethylene urea); polyurethanes such as those described in the patents U.S. 2,731,445 and U.S. 2,731,446; polyesters such as poly(ethylene terephthalate) and copolyesters; polysulfonamides; polysulfones; polyethers; cellulose derivatives such as chloroform-soluble and acetone-soluble cellulose acetate, and many others. As illustrated above, copolymers of all types can be used as well as the homopolymers listed above. The term copolymer is intended to include all types, such as random, ordered, segmented, block, and graft copolymers. The polymer particles may be hard or rubbery, or may even be cross-linked, providing the degree of tightness of cross-linking is not sufficient to prevent the coalescence required to produce the desired structure.

The process can also be employed to convert a mixture of compatible polymers into a shaped structure from a single aqueous dispersion. Cross-linked polymer particles can also be used as a part of the polymer mixture. The major requirements are that the cross-linked polymer be capable of being prepared in dispersion form and that this dispersion be compatible with the dispersion of linear polymer particles. The cross-linked polymer components usually constitute a minor amount (i.e., less than 50%) of the total polymeric constituents. Depending upon the type of cross-linked polymer employed, these polymer particles may remain discrete in the final shaped article or they may be partially or wholly fused with the linear polymer components.

The term "aqueous dispersion" refers to an aqueous medium in which discrete particles of polymer are dispersed homogeneously. These particles may be as large as about 15 microns but are preferably in the colloidal range of 0.05 to 1.5 microns. Polymer particles of this size are obtained, if necessary, by mechanical means, such as by use of micronizers, hammer mills, ball mills, and similar pulverizers. The reduction in size of the polymer particles may be accomplished when the polymer is in the dry state or while it is in the form of a slurry, such as by the use of a three-roll paint mill.

The dispersions of the various polymers may be prepared in many ways. For example, they are prepared readily by mixing finely divided polymers with water in the amount desired. The water should preferably contain a surface-active agent when using this method. In some instances one may wish, for example, to prepare a dispersion by emulsifying in water a solution of the polymer in a non-aqueous solvent and evaporating the solvent. Under suitable polymerizing conditions, polymer dispersions may be obtained in which the particles are of appropriate size for use in this process. Suspensions of appropriately fine polymers, as obtained from emulsion polymerization processes in aqueous media, may be employed directly and are preferred when they can be prepared. It is also possible to add the polymer in a sufficiently finely divided form directly to the solution of the matrix material, but in this case a surface-active agent for assisting in the dispersion of the polymer, is also present, the mixture being agitated strongly to insure dispersion of the polymer in the matrix.

Polymers are also obtained frequently as dispersions in organic media. For example, condensation polymers prepared by the interfacial polymerization technique may be obtained as discrete polymer particles dispersed in the organic phase. An aqueous dispersion can be obtained from this without isolating the polymer by mixing the dispersion with an aqueous medium. If the water wets the polymer particles preferentially, which wetting usually requires the addition of an emulsifying agent, the polymer particles will transfer from the organic to the aqueous phase. The organic phase can then be withdrawn and the aqueous dispersion utilized in this process.

Dispersion of polytetrafluoroethylene in particular, may be prepared according to the procedures of Llewellyn and Lontz U.S. Patent No. 2,685,707; Berry U.S. Patent No. 2,559,750; Renfrew U.S. Patent No. 2,534,058 and Berry U.S. Patent No. 2,478,229.

The polymers dispersed and treated in accordance with the present invention can vary widely as to molecular weight, the range for polytetrafluoroethylene, for example, being from 5,000 to 1,000,000 (preferably 8,000 and higher). Satisfactory tetrafluoroethylene polymers may be prepared as described in Lontz U.S. Patent No. 2,685,707.

It can be seen from the examples that complete coalescence of the polytetrafluoroethylene particles is achieved by sintering. Development of optimum mechanical properties is dependent in part upon the sintering conditions, since incomplete sintering results in weak spots with attendant poor mechanical properties. The optimum temperature for the developing of maximum properties for polytetrafluoroethylene fibers and films appears to be approximately 350 to 400° C. At this temperature, yarns have to be sintered about 2–7 seconds before maximum physical properties can be developed. While higher sintering temperatures naturally require shorter sintering times (and sintering temperatures up to 430° C. have been used successfully), at temperatures below about 375° C. the contact times required to develop maximum properties become excessive. Other polymers can be sintered by a similar method or they can be coalesced by other means, i.e., polyacrylonitrile coalesces by a treatment with calcium thiocyanate solution.

Suitable tensile properties for commercial applications of polytetrafluoroethylene are obtained by drawing the filaments after sintering, preferably at temperatures between the melting point and the decomposition temperature of the polymer. Polymer temperatures of approximately 430° C. represent the practical upper limit, since polymer degradation begins to become appreciable at this temperature. The crystalline melting point of polytetrafluoroethylene (i.e., 327° C.) is a lower limit for sintering this polymer. When sintering and drawing are combined into a single operation, temperatures of approximately 400° C. represent about the best balance between sintering rate, drawability, decomposition, and the yarn properties. Where drawing is performed as a separate operation, it is preferably carried out at temperatures between 330° C. and 400° C. for polytetrafluoroethylene.

A great advantage of the present invention is the possibility of producing shaped articles from the polytetrafluoroethylene dispersion without separating it from its preparation mixture. This invention, therefore, offers a great improvement for the process described in U.S. 2,413,498 to Hill, issued 1946, according to which the said dry polymer has to be comminuted first and can only be shaped in this form with the use of a matrix material.

The present invention provides an efficient and economical method for producing a wide variety of articles without many disadvantages inherent in known processes and is particularly applicable for making products from polymers that cannot be spun or otherwise shaped or can be spun or shaped with great difficulty and expense.

Inasmuch as the above description is illustrative rather than limitative, any departure therefrom which conforms to the spirit of the invention, is also intended to be included within the scope of the claim.

I claim:

A process which comprises commingling from about 15% by weight to about 85% by weight of a finely-divided polytetrafluoroethylene having a molecular weight of at least about 5000 in an aqueous solution containing from about 2% by weight to about 10% by weight of a gelable polymer selected from the group consisting of polyvinyl alcohol, vinyl alcohol-vinyl acetate copolymers, dextran and starch acetate, said polytetrafluoroethylene being present as particles of a size no greater than about 15 microns; adding from about 0.05% by weight to about 5% by weight of a water-soluble borate having a solubility in water of at least about 3% and a pH of at least about 7 to convert the resulting mixture to a form stable gel, the said borate being a member of the class consisting of $X_2B_4O_7$, $X_3BO_3$, $XBO_2$, $XBO_3$, $X_2HBO_3$ and $XH_2BO_3$, X being a member of the class consisting of sodium, potassium and lithium, and thereafter extruding the said gel under a pressure of at least about 500 p.s.i. into a self-supporting filament.

References Cited in the file of this patent

UNITED STATES PATENTS

| | | |
|---|---|---|
| 2,311,233 | Jaemicke | Feb. 16, 1943 |
| 2,413,498 | Hill | Dec. 31, 1946 |
| 2,439,108 | Staehle | Apr. 6, 1948 |
| 2,506,537 | Barnes | May 2, 1950 |
| 2,522,771 | Barnes | Sept. 19, 1950 |
| 2,534,326 | Weaver | Dec. 19, 1950 |
| 2,604,388 | Staeble | July 22, 1952 |
| 2,621,103 | Drisch | Dec. 9, 1952 |
| 2,675,315 | Staehle | Apr. 13, 1954 |
| 2,720,468 | Shacklett | Oct. 11, 1955 |
| 2,737,436 | Le Boeuf | Mar. 6, 1956 |
| 2,745,813 | Logemann | May 15, 1956 |
| 2,772,444 | Burrows | Dec. 4, 1956 |
| 2,809,949 | Orth | Oct. 15, 1957 |
| 2,829,944 | Houtz et al. | Apr. 8, 1958 |
| 2,834,758 | Schacklett | May 13, 1958 |
| 2,840,447 | Green | June 24, 1958 |